April 3, 1956 H. A. BING ET AL 2,740,340
PHOTOGRAPHIC APPARATUS
Filed March 20, 1952 8 Sheets-Sheet 1

INVENTORS
Herbert A. Bing
and
James E. Hunter, Jr.
BY Brown and Mikulka
and
Gerald Altman
ATTORNEYS April 3, 1956 H. A. BING ET AL 2,740,340
PHOTOGRAPHIC APPARATUS
Filed March 20, 1952 3 Sheets-Sheet 3

INVENTORS
Herbert A. Bing
and
James E. Hunter, Jr.
BY Brown and Mikulka
and
Gerald Altman
ATTORNEYS

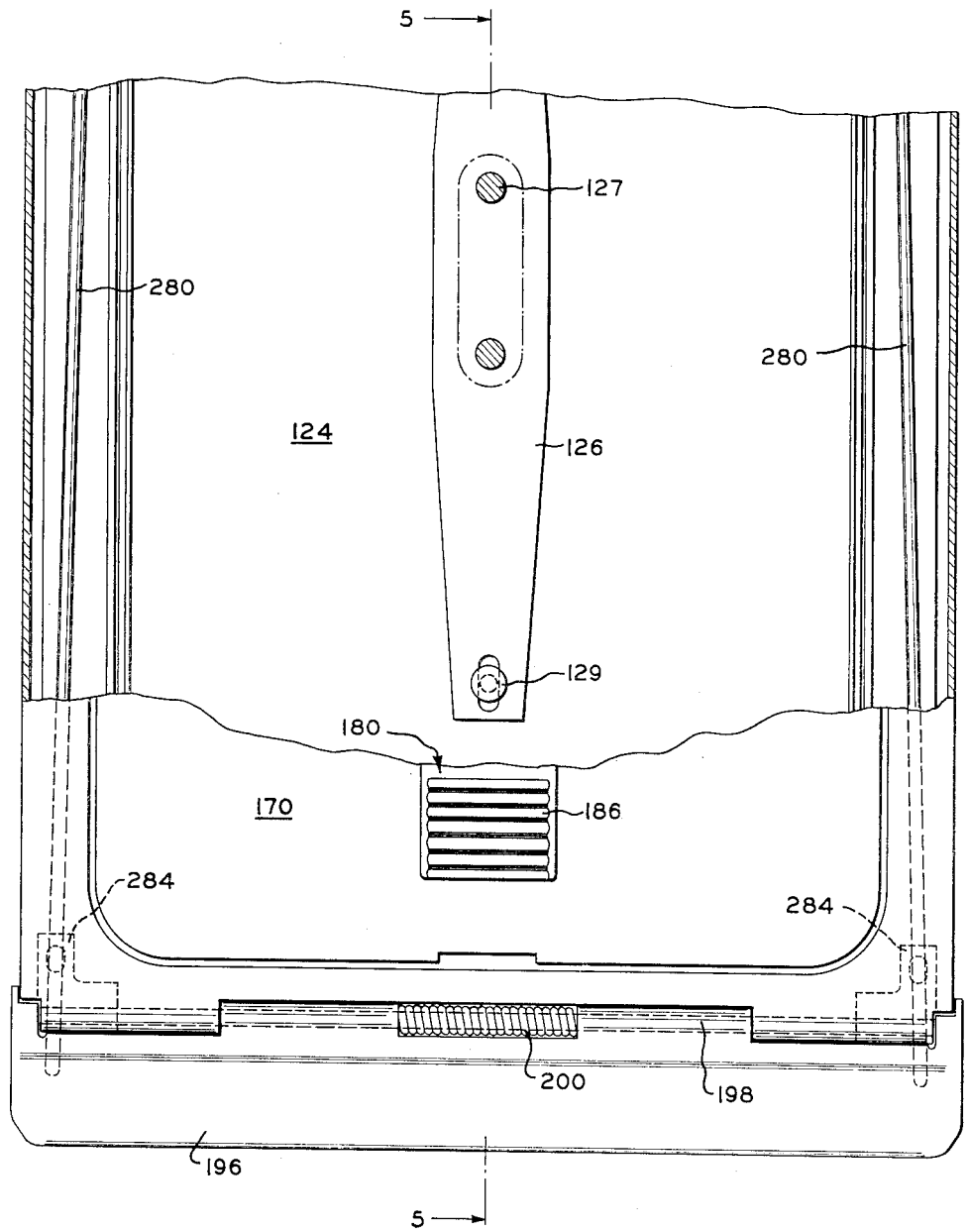

April 3, 1956   H. A. BING ET AL   2,740,340
PHOTOGRAPHIC APPARATUS
Filed March 20, 1952   8 Sheets-Sheet 6
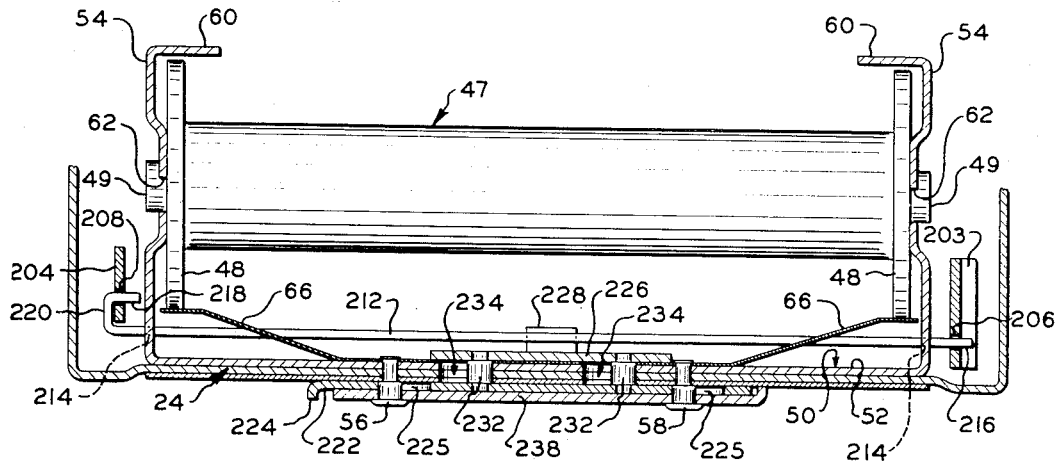
FIG. 7
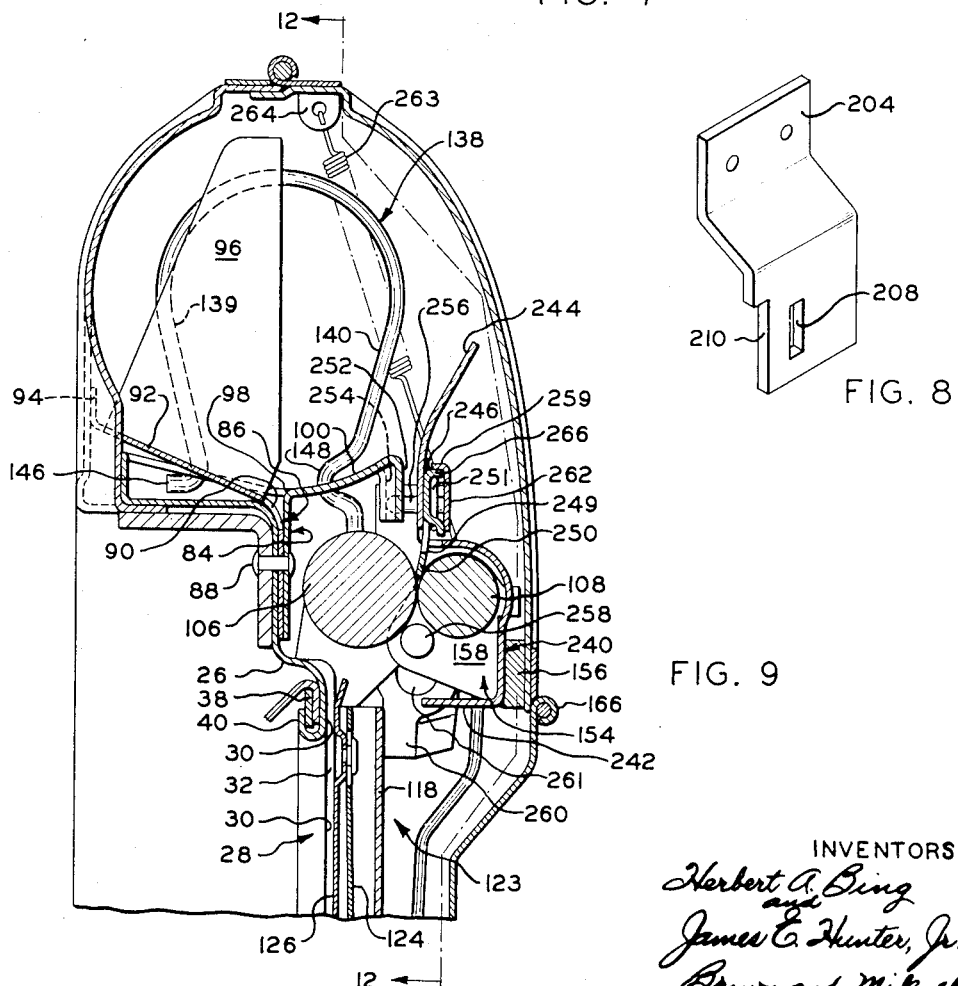
FIG. 8
FIG. 9
INVENTORS
Herbert A. Bing
James E. Hunter, Jr.
BY Brown and Mikulka
and
Gerald Altman
ATTORNEYS

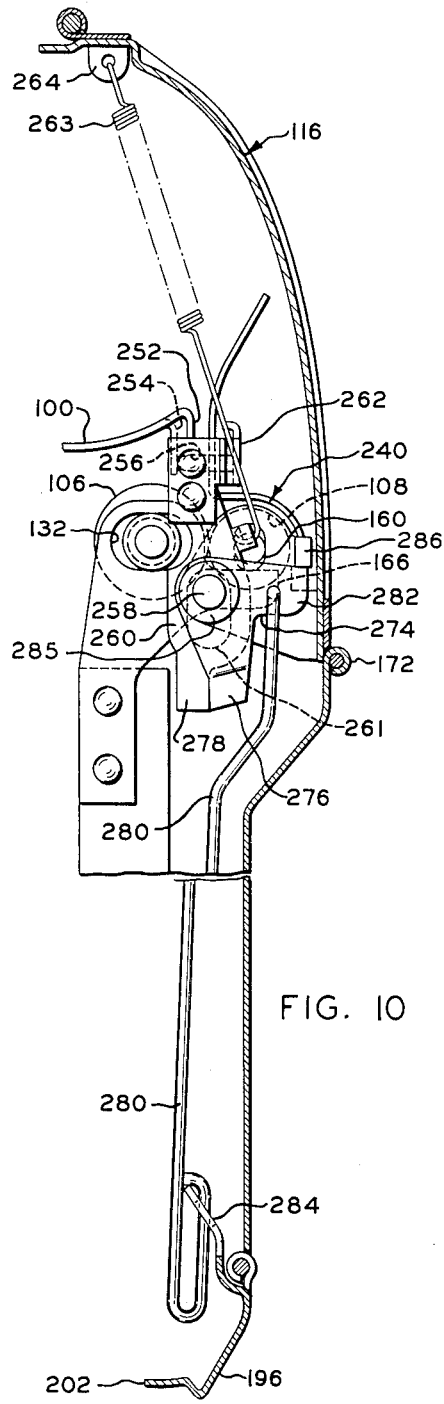
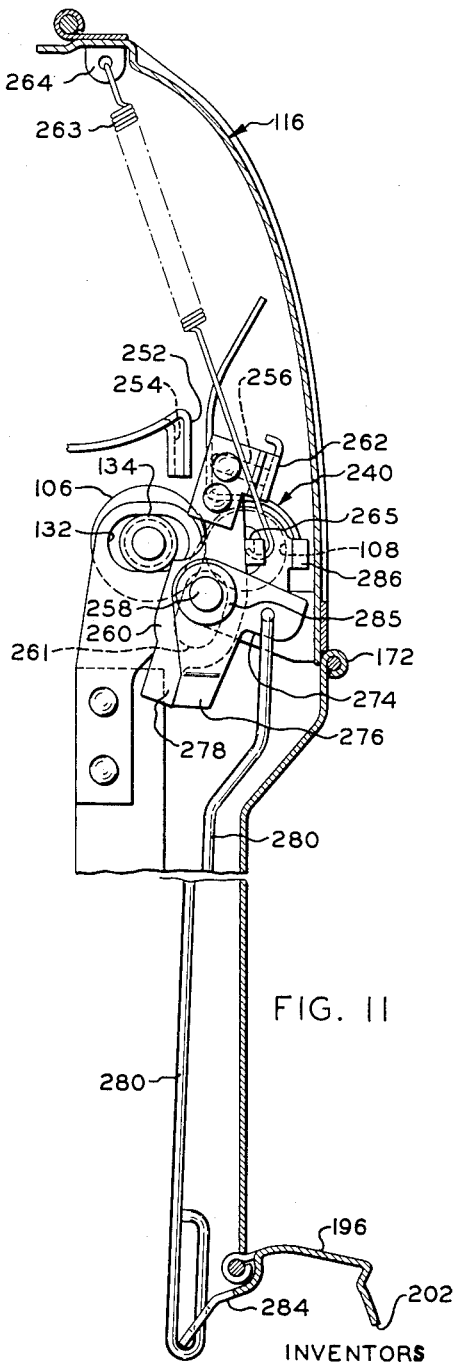
FIG. 10
FIG. 11

United States Patent Office 2,740,340
Patented Apr. 3, 1956

2,740,340

PHOTOGRAPHIC APPARATUS

Herbert A. Bing, Wellesley, and James E. Hunter, Jr., Norwood, Mass., assignors to Polaroid Corporation, Cambridge, Mass., a corporation of Delaware Application March 20, 1952, Serial No. 277,672

21 Claims. (Cl. 95—13)

This invention relates to photography and more particularly to photographic apparatus wherein a photosensitive sheet is exposed and thereafter processed by superposing said sheet on another sheet and spreading a processing composition between said sheets.

Objects of the invention are to provide, in a photographic apparatus that comprises a housing defining a path through which a sheet is adapted to advance, a novel stop means for arresting advancement of said sheet; to provide a stop means for arresting advancement of a sheet that has a succession of marginal perforations, said stop means including at least one pin that is adapted to engage at least one of said apertures and a brake that is adapted to act on said sheet upon engagement of said one pin with said one aperture; to provide a housing defining a chamber having an entrance passage and an exit passage, said chamber being so constructed as to enable a sheet to advance through said entrance passage into said chamber and thence through said exit passage from said chamber, closure means for said exit passage, said closure means, when in open position, permitting advancement of said sheet from said chamber through said exit passage, stop means, said stop means, when actuated, being operative to arrest advancement of said sheet, and means responsive to movement of said closure means for deactuating said stop means; to provide an apparatus for exposing and processing at least a frame of a photosensitive sheet, wherein a pair of pressure-applying members are provided between which said photosensitive sheet and another sheet may be advanced in superposed relation with a layer of processing composition therebetween to form a sandwich, said apparatus being provided with a novel stop means operative to predeterminedly arrest advancement of said sandwich; and to provide apparatus of the above type that is simple in operation and inexpensive in construction.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 4 is an enlarged, fragmentary view taken substantially along the line 4—4 of Fig. 1;

Fig. 7 is a fragmentary, sectional view taken substantially along the line 7—7 of Fig. 6;

Fig. 8 shows plan and edge views of one of the disclosed elements;

Fig. 9 is a fragmentary, sectional view taken substantially along the line 9—9 of Fig. 2 and showing details of the stop means for predeterminedly arresting advancement of the sheets;

Fig. 10 is a fragmentary, sectional view, similar to that of Fig. 4, showing the stop means when actuated and the interrelationship between the stop means and the closure means;

Fig. 11 is a fragmentary, sectional view, similar to that of Fig. 5, showing the stop means when deactuated.

Figure 1:
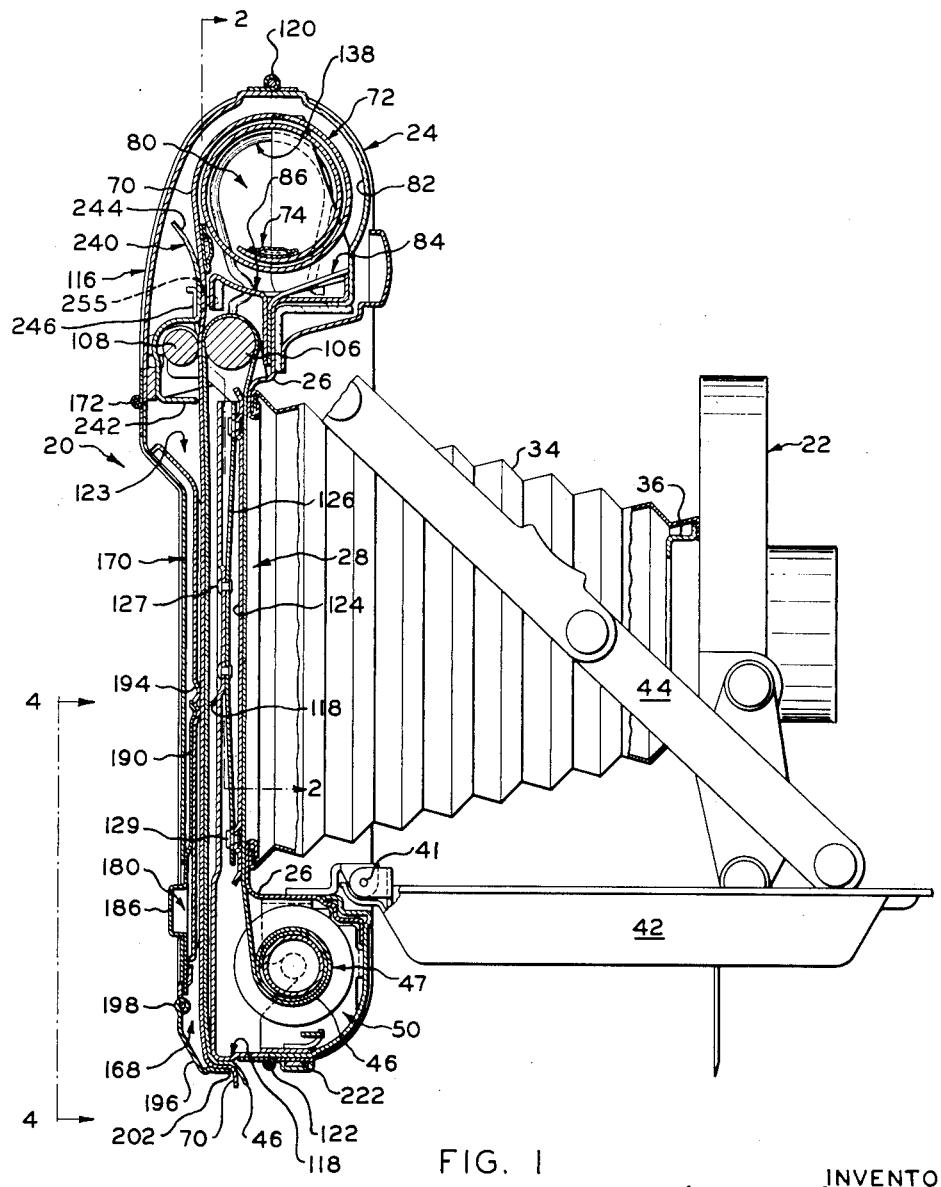
Figure 1 is a diagrammatic, fragmentary view, partly in section, of a handheld camera embodying the herein disclosed invention with a photosensitive sheet and another sheet mounted therein, the section being taken along a line midway between the sides of the camera.

Photographic apparatus of the type herein illustrated generally includes means for processing an exposed photosensitive sheet by superposing said photosensitive sheet on another sheet and by spreading a thin layer of processing composition between said sheets. The photosensitive sheet may comprise a silver halide layer. In one form thereof, the second sheet comprises a silver precipitating layer. The processing composition, by way of example, may comprise a developer, a silver halide solvent and an alkali. In practice, superposition of said sheets with a thin layer of processing composition therebetween is accomplished by advancing said sheets between a pair of pressure-applying members. The result of this procedure is to develop the latent image on the photosensitive sheet to silver and to form in a frame of the photosensitive sheet a soluble silver complex from unexposed silver halide for transfer to the other sheet. This complex, at least in part, may be transferred by inhibition to a frame of the other sheet where it may be developed to silver to produce a positive image.

The photographic process and various species of photosensitive and other sheets herein referred to are described in detail in Patent No. 2,543,181, issued to Edwin H. Land on February 27, 1951, for Photographic Product Comprising a Rupturable Container Carrying a Photographic Processing Liquid. It is, of course, to be understood that the apparatus herein described is not limited to use with any particular species of photosensitive or other sheets, the terms "photosensitive sheet" and "other sheet" being used in their broadest sense to indicate a first sheet which is photosensitive and a second sheet which merely may aid in spreading the processing composition over the surface of the photosensitive sheet or which may, if desired, possess other characteristics.

Generally, the embodiment of the herein disclosed invention illustrated in the accompanying drawings is a handheld camera in which there is provided an exposure chamber and a processing chamber. Successive portions of a photosensitive sheet may be successively positioned within the exposure chamber in order to produce latent images therein. At the entrance to the processing chamber there is provided a pair of pressure-applying rollers which are adapted to receive therebetween the photosensitive sheet from the exposure chamber and to superpose and register the photosensitive sheet with another sheet. The other sheet has on one surface thereof a succession of image-receiving areas which are registrable with said frames and has affixed thereto a succession of containers of processing composition, one container being associated with one-image-receiving area. When the sheets are advanced in superposed relation between the pressure-applying rollers, processing composition is ejected from a container and is spread in a thin layer between a frame of the photosensitive sheet and an image-receiving area of the other sheet, thereby forming a sandwich which advances into the processing chamber. A stop means is provided for arresting advancement of the sandwich when one frame and the image-receiving area with which it is registered have advanced entirely between the rollers. The aforementioned frame and area are allowed to remain in the processing chamber for a predetermined time during which the latent image in the frame is developed and a positive print is formed in the image-receiving area with which said frame is registered. At the end of the predetermined time, the processing chamber may be opened and the developed positive print may be removed.

Figure 5:
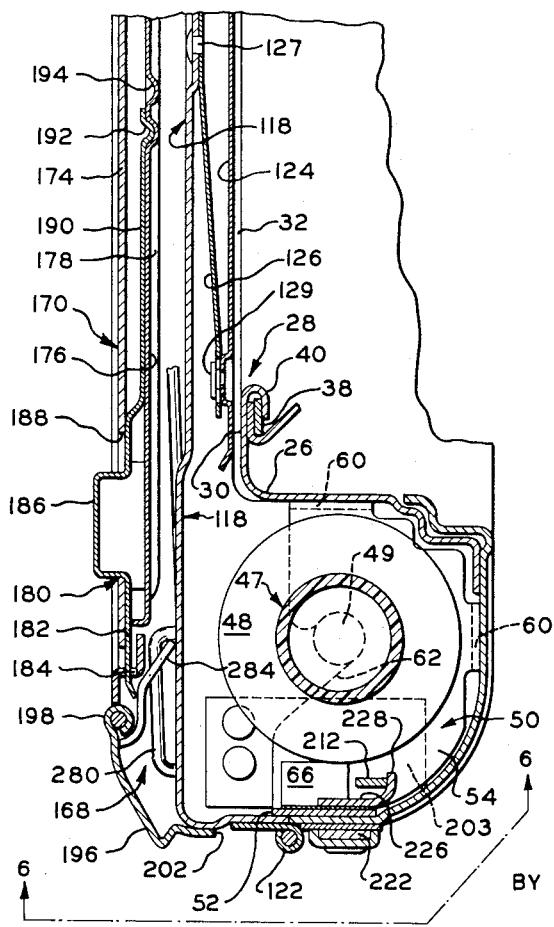
Fig. 5 is a fragmentary, sectional mirror view taken substantially along the line 5—5 of Fig. 4.

Referring now to the drawings, wherein like numerals denote like parts, there is shown in Fig. 1 a handheld camera of the folding type which embodies the present invention. As a means for supporting and enclosing the various components of the camera, a housing, generally designated by 20, is provided. Associated with housing 20 is a suitable lens and shutter assembly 22 which may be of conventional design but which preferably is of the type disclosed in Patent No. 2,531,936, issued to Murry N. Fairbank and Sidney B. Whittier on November 28, 1950, for Camera Shutter Mechanism. In the form shown, housing 20 comprises a front portion 24 which provides a central re-entrant section 26 having a light-transmitting aperture 28. Section 26 further provides (Figs. 5 and 9) guide surfaces 30 which surround aperture 28 and guide tracks 32 on opposite sides of aperture 28 which serve to position a photosensitive sheet for exposure in the focal surface of the lens of assembly 22. A suitable bellows 34 provides an optical path from the lens of assembly 22 to a photosensitive sheet positioned adjacent aperture 28 by surfaces 30 and tracks 32. One end of bellows 34 is fastened in light-tight fashion to assembly 22 by such means as a centrally apertured, dished-out, clamping plate 36 suitably connected to assembly 22. The other end of bellows 34 is fastened in light-tight fashion to re-entrant section 26 by such means (Figs. 5 and 9) as a gasket 38 and in-turned clamping flanges 40. Pivotally mounted on front portion 24, as at 41, is a bed 42 which is adapted to support assembly 22 when in open position and which, in conjunction with re-entrant section 26, encloses and protects assembly 22 when in closed position. A suitable linkage, designated generally by 44, is provided for erecting assembly 22 when bed 42 is in open position.

One example of a supply of photosensitive sheet that is adapted to be exposed and processed within the illustrated camera is shown in Fig. 1 as being mounted within housing 20. This supply includes a photosensitive sheet 46 which preferably comprises a suitable base and a suitable photosensitive layer on one side of the base. The photosensitive layer, for example, may be composed of a silver halide emulsion and is provided with a succession of frames that are adapted to receive a succession of latent images upon photoexposure. The supply of sheet 46 is carried by a spool 47 of conventional design (Figs. 1 and 5) having a spindle around which sheet 46 is coiled, a pair of disks 48 for aligning the successive convolutions of sheet 46, and a pair of stub shafts 49 extending from opposite ends of the spool.

As a means for mounting the supply of photosensitive sheet, there is provided a U-shaped member 50 (Figs. 1, 5 and 7) having a bight portion 52 and a pair of legs 54. Viewing Fig. 7, bight portion 52 is secured to lower edge of front portion 24 as by means of rivets 56 and 58. Legs 54 are positioned adjacent opposite edges of front portion 24 and are securely seated by means of pairs of in-turned stubs 60 suitably secured to front portion 24.

Each leg 54 is provided with a slot 62 that is adapted to receive one of stub shafts 49. When stub shafts 49 are seated in slots 62, disks 48 act to prevent longitudinal movement of spool 47. Such means as a drag spring 66 (Figs. 5 and 7), the central portion of which may be secured to bight portion 52 as by means of rivets 56 and 58 and the ends of which are adapted to engage disks 48, acts to lock stub shafts 49 in slots 62 and to prevent excess rotation of spool 47.

Another sheet 70, in conjunction with which photosensitive sheet 46 may be processed, is shown in Fig. 1 as being supplied from a roll 72. Sheet 70 preferably comprises a suitable base and a suitable image-receiving layer on one side of the base. The image-receiving layer, for example, may comprise one of the compositions, now well known in the art, which adapt it to receive, in successive image-receiving areas thereof, positive prints of the latent images in frames of photosensitive sheet 46. A succession of containers, designated generally by 74 in the illustrated embodiment, are provided for carrying a liquid processing composition. As shown, containers 74 are affixed to the image-receiving layer of sheet 70 at substantially regularly spaced intervals from a location adjacent a leading end thereof toward the trailing end thereof, containers 74 being so spaced that one container is associated with one image-receiving area. Each container is provided with a rupturable mouth, facing the trailing end of sheet 70, which mouth is adapted to eject processing composition when opposed compressional forces are applied to container 74.

Figure 2:
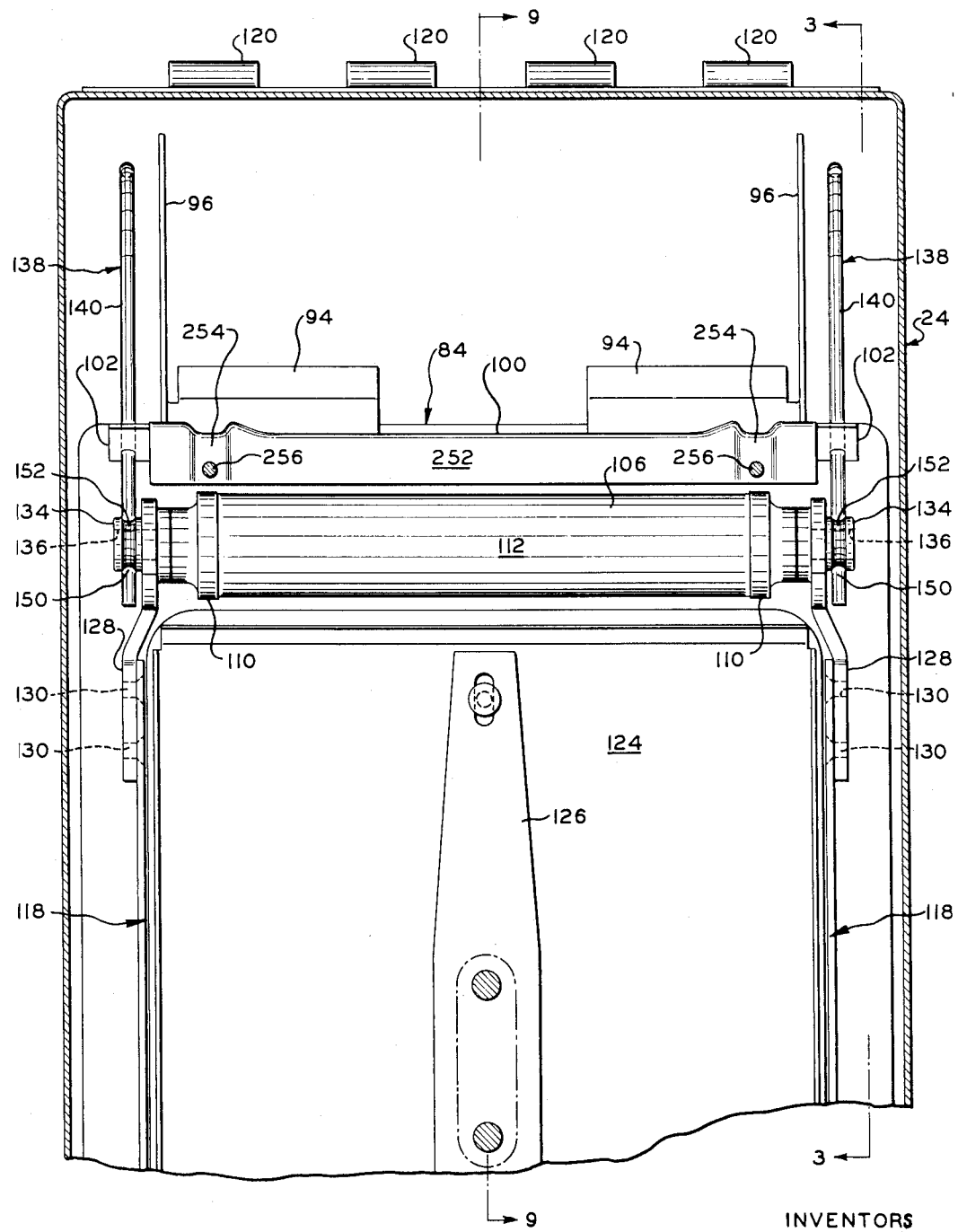
Fig. 2 is an enlarged, fragmentary, sectional view taken substantially along the line 2—2 of Fig. 1.
Figure 3:
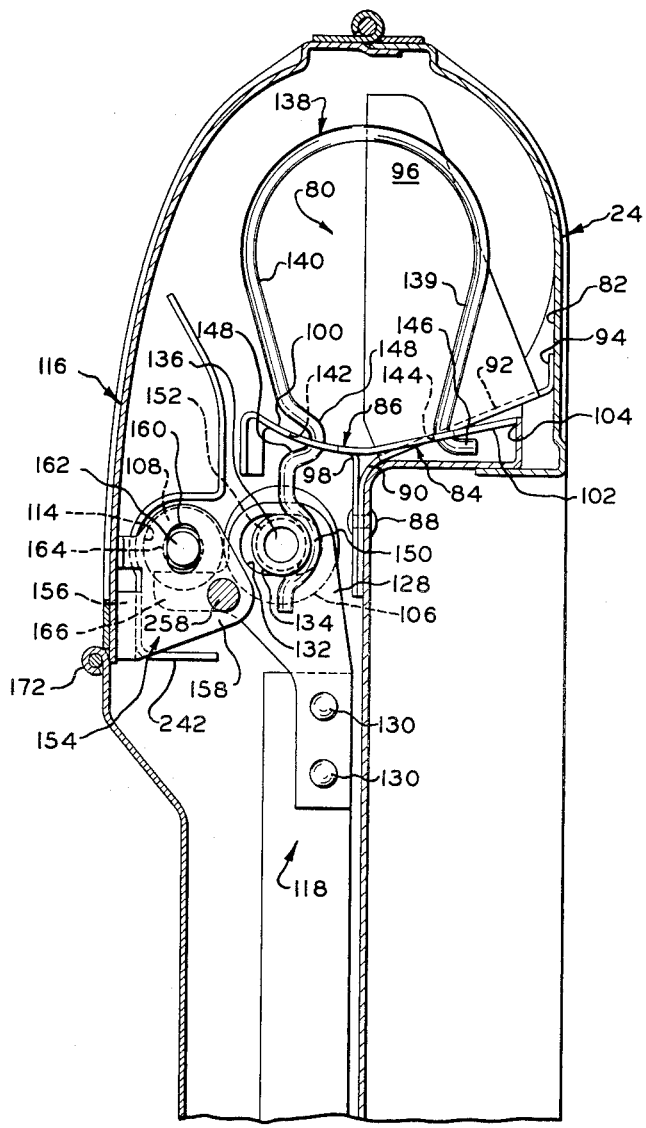
Fig. 3 is a fragmentrary, sectional view taken substantially along the line 3—3 of Fig. 2 and showing details of the pressure-applying members between which the aforementioned sheets may be advanced in superposed relation with a layer of processing composition therebetween.
Figure 6:
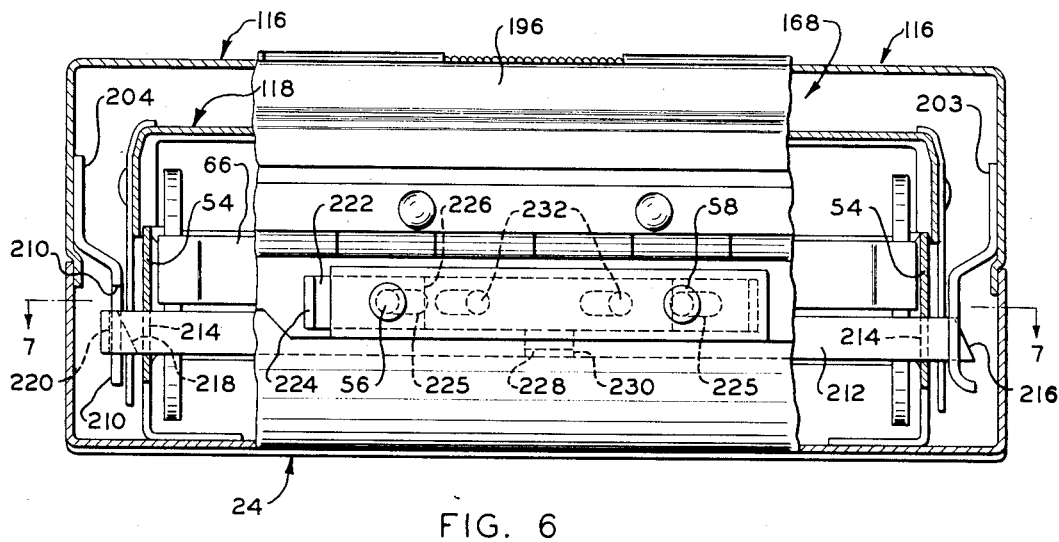
Fig. 6 is a fragmentary view taken substantially along the line 6—6 of Fig. 5.

Means are provided for mounting roll 72 within housing 20. As shown (Fig. 1), roll 72 is mounted in a compartment 80 having walls that are provided by a section 82 of front portion 24 and by various sections of a sheet metal member 84 and a sheet metal member 86. Details of members 84 and 86 are advantageously shown in Figs. 2 and 3. Member 84 is suitably fastened to front portion 24 as by means of a rivet 88 and is bent, as at 90, to provide a wall 92. Extending from wall 92 adjacent opposite edges thereof are a pair of flanges 94 (one of which is shown in Fig. 3) that are suitably connected to section 82. Extending from opposite edges of wall 92 are a pair of armlike walls 96 that are adapted to retain the opposite ends of roll 72. Member 86, like member 84, is fastened to front portion 24 as by means of rivet 88. Member 86 is bent, as at 98, to form a continuation 100 of wall 92. A pair of legs 102, which are struck up from the opposite edges of member 86, straddle walls 92 and 96 and are fastened to front portion 24 as at 104.

In accordance with the present invention, pressure-applying means are provided for processing latent images in frames of sheet 46. In the form thereof as shown, the pressure-applying means comprises a pair of rollers 106 and 108 (Figs. 1, 2 and 3) between which sheets 46 and 70 may be advanced in superposed relation. Advancement of a frame of sheet 46 and an associated image-receiving area of sheet 70 between the rollers causes ejection of processing composition from the mouth of a container 74 and spreading of said processing composition between the sheets to form a sandwich in which the latent image in the frame is processed and a positive print is formed in the image-receiving area.

Roller 106 is provided (Fig. 2) with a pair of shouldered end portions 110 and an intermediate pressure-applying surface 112. Roller 108 is provided with a pressure-applying surface 114 (Fig. 3). When sheets 46 and 70 are advanced in superposition between rollers 106 and 108, shouldered end portions 110 are spaced from surface 112 by a distance equal to the combined thickness of sheets 46 and 70. Rollers 106 and 108 are so constructed that, under such circumstances, surface 112 is spaced from surface 114 by a distance equal to the combined thickness of sheets 46 and 70, plus a predetermined increment which determines the thickness of the layer of processing composition spread between the sheets.

In accordance with the present invention, means are provided which define an exposure chamber wherein latent images may be formed in frames of sheet 46 and a light-tight processing chamber into which a sandwich of portions of sheets 46 and 70 may be advanced from between rollers 106 and 108 and stored for a predetermined processing time. Said means, in the form shown, comprises a rear portion 116 and an intermediate portion 118 of housing 20. Viewing Fig. 1, rear portion 116 is pivotally attached to the upper extremity of front portion 24, as by means of a hinge 120, and intermediate portion 118 is pivotally attached to the lower extremity of front portion 24, as by means of a hinge 122. Portions 116 and 118, when in open position, provide access to the interior of the camera. When in closed position, portion 118 defines an exposure chamber in conjunction with forward portion 24 and bellows 34. When in closed position, portions 116 and 118 define between their adjacent overlapping surfaces a processing chamber 123.

As a means for holding a portion of sheet 46 in exposure position on guide surfaces 30 and between guide tracks 32, a pressure plate 124 (Figs. 1, 2 and 5) is provided. As shown, plate 124 is mounted on intermediate portion 118 by a leaf spring 126, the central section of which is suitably connected, as at 127, to the intermediate portion and the ends of which are suitably connected, as at 129, to the plate.

In the illustrated embodiment, roller 106 (Fig. 3) is mounted on intermediate portion 118 and roller 108 is mounted on rear portion 116, the rollers being so mounted as to be operatively juxtaposed when portions 116 and 118 are in closed position and to be spaced apart to permit sheets 46 and 70 to be extended therebetween when portions 116 and 118 are in open position.

In order to generate pressure between rollers 106 and 108, means are provided for resiliently biasing roller 106 toward roller 108 when portions 116 and 118 are in closed position. As shown (Figs. 2 and 3), roller 106 is mounted on a pair of supports 128 which are positioned at opposite edges of the free end of intermediate portion 118 by such means as rivets 130. Each support 128 is provided with an elongated bearing slot 132 into which a slidable bushing 134 projects. Extending from opposite ends of roller 106 are a pair of stub shafts 136 which are received in bushings 134. By virtue of the slidable construction of bushings 134 in slots 132, roller 106 is movable longitudinally of slot 132 or, otherwise stated, is linearly movable toward and away from roller 108 when rollers 106 and 108 are operatively juxtaposed. The resilient biasing means, in the illustrated embodiment, comprises a pair of flexed, substantially U-shaped springs 138 (Figs. 2 and 3) which are mounted on opposite sides of housing 20, each spring being mounted between a wall 96 of member 84 and a side of front portion 24. Each spring 138 comprises a pair of legs 139 and 140. Springs 138 are mounted on opposite edges of member 86 with legs 140 extending into a pair of elongated slots 142 at opposite edges of continuation 100 and legs 139 extending into a pair of slots 144 in legs 102. Hooked sections 146 and 148 of springs 138 are adapted to prevent dislodgment of legs 139 and 140 from slots 144 and 142, respectively. Slots 142 are sufficiently elongated to allow considerable movement of legs 140 toward and away from legs 139. Legs 140 are provided with arcuate extensions 150 which are adapted to engage peripheral grooves 152 on the peripheries of bushings 134. Viewing Fig. 3, if intermediate portion 118 is in open position, arcuate extensions 150 are spaced from bushings 134 and hooked sections 148 are resiliently urged into abutment with the left ends of slots 142. If intermediate portion 118 and rearward portion 116 both are pivoted into closed position, arcuate extensions 150 engage bushings 134 and bias roller 106 against roller 108.

In the illustrated embodiment, effective spreading of processing composition 76 between sheets 46 and 70 is dependent upon the position and direction of the compressional forces exerted by rollers 106 and 108. In order that these compressional forces be correctly positioned and applied, precise alignment of the rollers is desirable. Therefore, means are provided for operatively aligning the rollers when intermediate portion 118 and rear portion 116 are in closed position. In the illustrated embodiment, roller 108 is mounted (Fig. 3) on rear portion 116 by such means as a cradle 154. Cradle 154 has a yoke 156 and a pair of legs 158, each of which is provided with an elongated bearing slot 160. Extending from the opposite ends of roller 108 are a pair of stub shafts 162 extending into slots 160. A bushing 164, shown in Fig. 3 in dotted lines, is mounted on each stub shaft between a leg 158 of cradle 154 and an end of roller 108. Extending from the supports 128 are a pair of fingers 166 which are adapted to abut against bushings 164 in order to align rollers 106 and 108 when intermediate portion 118 and rearward portion 116 are in closed position. Viewing Fig. 3, advancement of sheets 46 and 70 between rollers 106 and 108 urges roller 108 downwardly with stub shafts 162 riding in vertically extending slots 160 until bushings 164 engage fingers 166.

In practice, sheet 46 extends from spool 47 (Fig. 1) past guide surfaces 30 (Fig. 5) and into contact with roller 106 (Fig. 1). Sheet 70 (Fig. 1) extends from roll 72 into contact with roller 108 and into superposition with sheet 46 to form therewith a sandwich which extends between the rollers and into processing chamber 123. Viewing Fig. 1, the lower sections of rear portion 116 and intermediate portion 118 are so constructed as to provide processing chamber 123 with an exit passage 168 through which portions of the sandwich positioned within the processing chamber may be removed therefrom. An operator, by grasping the leading portion of the sandwich extending from passage 168, may draw the sandwich through passage 168 and thereby may advance unprocessed portions of sheets 46 and 70 between rollers 106 and 108 and into processing chamber 123.

Thus, a frame of sheet 46, initially positioned for exposure on guide surfaces 30, may be advanced toward registration with an image-receiving area of sheet 70. Continued advancement of sheets 46 and 70 between rollers 106 and 108 causes ejection of processing composition 76 from the container 74 associated with said frame and image-receiving area and causes spreading of the processing composition therebetween to form a sandwich. The frame and the image-receiving area advance from rollers 106 and 108 into processing chamber 123 and are permitted to remain therewithin for a predetermined time during which the latent image in the frame is processed and a positive print is formed in the image-receiving area.

A suitable closure means, such as a door 170 (Figs. 1, 4 and 5), is provided to enable an operator to remove the undeveloped positive print from processing chamber 123. As shown, door 170 is pivoted, as at 172, to rear portion 116 of housing 20. Door 170 comprises an outer sheetlike element 174 and an inner sheetlike element 176. Element 176 is provided with a plurality of ribs 178, the convex surfaces of which serve to guide the sandwich as it advances through processing chamber 123. Suitable means are provided for latching door 170 in closed position, said means, in the form shown, comprising a channel-shaped carriage 180, the legs of which ride on the concave surfaces of two of the aforementioned ribs 178. Extending from carriage 180 is a tongue 182 which is adapted to extend through a slot 184 in rear portion 116 when door 170 is in closed position. By such means as a button 186, which may be stamped out of carriage 180 and which extends through an elongated slot 188 in element 174, an operator may slide tongue 182 into slot 184 in order to latch door 170 in closed position or may slide tongue 182 out of slot 184 in order to permit the opening of door 170. An extension 190 of carriage 180 is provided with a detent 192 which is adapted to coact with a pair of depressions 194 in member 176 to fix tongue 182 in its latched or unlatched position. When an image-receiving area and a frame with which it is registered have remained in processing chamber 123 for a predetermined processing time, door 170 may be opened. The positive print now may be ripped from the remainder of sheet 70, the ripping being aided by a series of perforations (not shown) which separate the image-receiving area from the remainder of sheet 70 and at the same time may be peeled from the frame of sheet 46 with which it has been registered.

It is desirable that light be excluded from chamber 123 during the processing of a frame and an image-receiving area registered therewithin. In accordance with the present invention, means are provided for rendering exit 168 lighttight. As shown, this means comprises a bar 196 (Figs. 1, 4 and 5) pivoted to rear portion 116, as at 198, and having edge portions which, when bar 196 is in closed position, snugly contact portions of housing 20 that are adjacent to passage 168. Such means as a coiled spring 200 is adapted to urge the edge portions of bar 196 into closed position. The edge 202 of bar 196 normally is in contact with superposed sheets 46 and 70 extending from exit 168 and serves as a cutting blade by which an operator can sever portions of the sandwich extending through passage 168 from portions remaining within chamber 123.

Latch means are provided for securing rear portion 116 in closed position, said latch means operating adjacent the edges of housing 20 in order not to obstruct exit passage 168 (Figs. 5, 6, 7 and 8). The latch means, in the form shown, comprises a pair of brackets 203 and 204 that are suitably affixed to opposite edges of rear portion 116 so as to straddle exposure chamber 123. Bracket 203 provides a recess 206. Bracket 204 (Fig. 8) provides a recess 208 and a cut-away portion 210. An elongated member or blade 212, which is slidably mounted on front portion 24 by means of suitable slots 214 in the legs 54 of U-shaped member 50, is adapted to coact with brackets 203 and 204 in the following manner. The extremeties of blade 212 constitute a pair of lugs 216 and 218, blade 212 being reversely bent, as at 220, so that lugs 216 and 218 extend in the same direction. Blade 212 may be operatively positioned so that lugs 216 and 218 engage recesses 206 and 208, respectively, for securing rear portion 116 to front portion 24. Blade 212 may be inoperatively positioned so that lugs 216 and 218 are disengaged from recesses 206 and 208, respectively, for permitting pivotal movement of rear portion 116 with respect to front portion 24.

As a means for enabling an operator to selectively position blade 212, a manually operable slide 222 is reciprocably mounted on front portion 24. Slide 222 has a turned end 224 which may be caught by the fingers of an operator and a pair of elongated slots 225 into which rivets 56 and 58 extend. As a means for operatively connecting slide 222 and blade 212, a metal strip 226 is provided. Strip 226 has integral therewith a lug 228 which projects into a notch 230 in blade 212. Strip 226 is connected to slide 222 by means of a pair of rivets 232 which extend through a pair of elongated slots 234 in front portion 24, one end of each rivet 232 being affixed to strip 226 and the other end being affixed to slide 222. A channel-shaped member 238 is affixed to front portion 24 as by means of rivets 56 and 58 in order to shield the greater portion of slide 222 from view.

Figure 12:
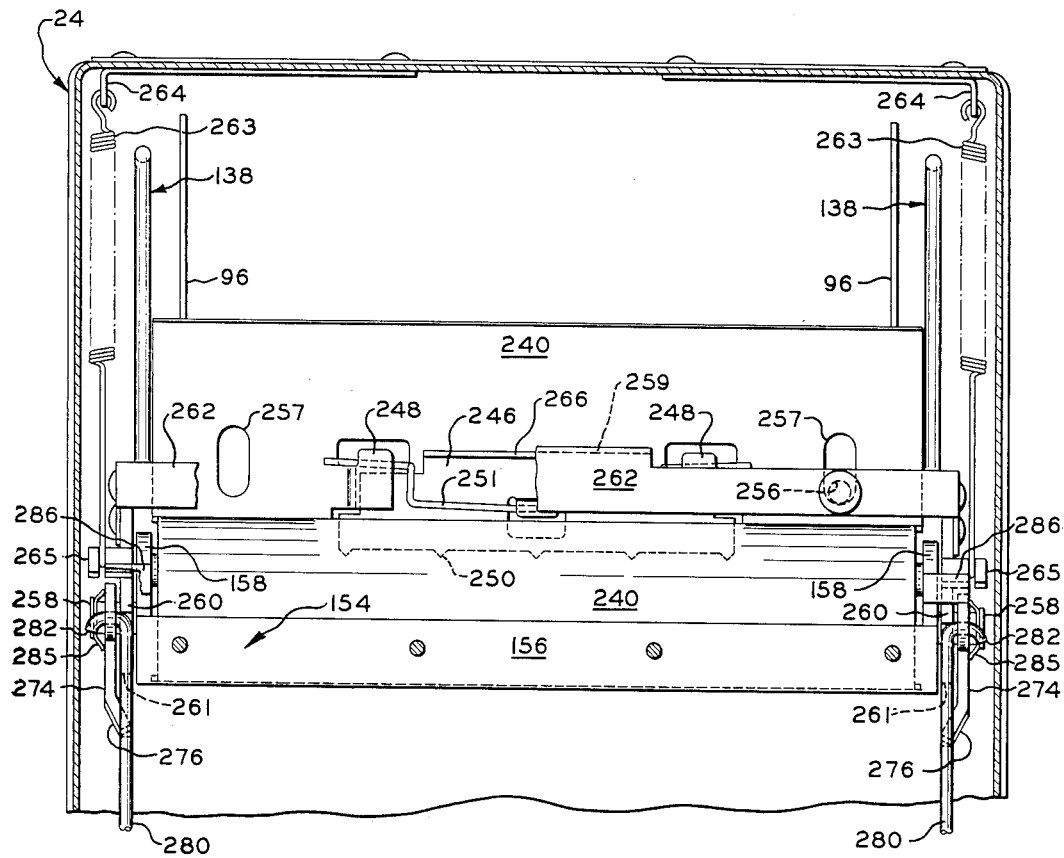
Fig. 12 is a fragmentary, sectional view taken substantially along the line 12–12 of Fig. 9.

Suitable shields are provided for excluding light from exposure chamber 123 when either or both door 170 and bar 196 are open. One such shield is shown at 240 (Figs. 1, 9 and 12) as comprising a sheet metal element suitably affixed to yoke 156 of cradle 154. Viewing Fig. 1, the lower section of shield 240 is bent inwardly at 242 and normally contacts a surface of sheet 70 extending into chamber 123. The upper portion 244 of shield 240 acts to retain roll 72 within chamber 80.

A stop means is provided for arresting movement of the sandwich upon advancement of a predetermined length thereof between rollers 106 and 108. The stop means, in the form shown, comprises a brake 246 (Figs. 1, 9 and 12) which is slidably mounted on a surface of shield 240 as by means of a pair of lugs 248 (Fig. 12) struck up therefrom. Brake 246 is bent medially, as at 249, and is provided with a plurality of barbs 250. Viewing Fig. 9, brake 246 may be said to be actuated when it has been urged downwardly to a position at which it arrests advancement of sheets 46 and 70. When brake 246 is urged downwardly, barbs 250 are adapted to pierce sheets 46 and 70 and to clamp them against roller 106. By virtue of bent portion 249, the lower portion of brake 246 acts as a cam which follows roller 108 in order to properly direct barbs 250 toward roller 106. Lugs 248 lie in a surface that is so spaced from the surface of the main body of shield 240 as to permit a slight pivotal movement of brake 246 that results from the cam action of the lower portion of brake 246. Brake 246 may be said to be deactuated when it has been urged upwardly to a position at which it is spaced from roller 108 and from sheets 46 and 70. Brake 246 normally is urged upwardly and into deactuated position by means of a wire spring 251 (Fig. 12), the center of which is connected to brake 246 and the ends of which are connected to shield 240.

In accordance with the present invention, control means are provided for actuating brake 246 upon advancement of one frame of sheet 46 and the image-receiving area of sheet 70 with which it is registered into processing chamber 123. In order to adapt it for use in the illustrated embodiment, sheet 70 may be provided with pairs of regularly spaced apertures 255 (one of which is shown in Fig. 1), the openings in a pair being positioned at opposite edges of sheet 70 and one pair being associated with one image-receiving area. As shown (Figs. 9, 10, 11 and 12), the control means includes an anvil 252 that is integral with the continuation 100 of member 86 and that is provided with a surface in superposition with which sheet 70 is adapted to move during advancement thereof. This surface is provided with a pair of depressions 254 over which the pairs of apertures 255 are adapted to move in aligned relation therewith. A pair of stop pins 256, which are aligned with depressions 254 and which are adapted to engage a pair of apertures 255 in sheet 70, project throuh a pair of slots 257 (Fig. 12) in shield 240 and are mounted in the following manner. Supported on legs 158 of cradle 154 are a pair of shouldered stub shafts 258. A pair of levers 260 are pivotally and slidably mounted on shafts 258 by means of elongated slots 261 into which said shafts extend. Connecting one of levers 260 with the other one thereof is a U-shaped bridge 262 which extends across the camera and which mounts thereon the stop pins 256.

Resilient means are provided for urging stop pins 256 into engagement with a pair of apertures 255 with which they become aligned during advancement of sheet 70 over the surface of anvil 252. As shown, the resilient means comprises a pair of springs 263, located at opposite edges of housing 20, each spring 263 being connected to rear portion 116, as at 264, and to a lever 260, by such means as a lug 265. Springs 263 urge bridge 262 and, consequently, stop pins 256 in a resultant direction having a first component substantially perpendicular to and toward anvil 252 and a second component substantially parallel to and opposite the direction of advancement of sheet 70 past anvil 252. Viewing Figs. 9, 10, 11 and 12, upward movement of bridge 262 is arrested when the lower end of slot 261 contacts stub shaft 258.

In order that brake 246 be responsive to the engagement of stop pins 256 with a pair of apertures 255 in sheet 70, bridge 262, on which the stop pins are mounted, and brake 246 are operatively interconnected. In the illustrated embodiment, bridge 262 and brake 246 are provided with flanges 259 and 266 (Figs. 9 and 12), respectively, which are adapted to engage each other in such a manner that engagement of at least one pin in an aperture 255 of sheet 70 during advancement thereof, viewing Figs. 9, 10, 11 and 12, causes downward movement of bridge 262 and actuation of brake 246.

Means are provided for releasing stop pins 256 from engagement with a pair of catches or apertures 255 in sheet 70 so as to enable upward movement of bridge 262 by reason of the contraction of springs 263 and upward movement or deactuation of brake 246 by reason of the reflex of spring 251. It is apparent that deactuation of brake 246 permits repetition of the exposure and processing cycle.

In the illustrated embodiment, the release means comprises a pair of similar mechanisms located at opposite edges of housing 20. Each mechanism includes a bell crank 274 pivotally mounted on one of stub shafts 258. At one extremity thereof, bell crank 274 is provided with a cam portion 276. Each lever 260 is provided with a finger 278 which is adapted to be engaged by cam portion 276 when the lever is in its lowermost position, the lever being urged into this position when stop pins 256 engage apertures 255 in sheet 70 during advancement thereof. Viewing Figs. 10 and 11, when lever 260 is in its lowermost position, clockwise rotation of crank 274, by virtue of the engagement of cam portion 276 with finger 278, causes clockwise rotation of bridge 262 and disengagement of stop pins 256 from apertures 255 in sheet 70. Upon release of stop pins 256 from apertures 255 in sheet 70, springs 263 urge bridge 262 and each lever 260 into their uppermost position, thereby permitting deactuation of brake 246.

In the illustrated embodiment, means are provided for interconnecting bar 196 and crank 274 so that an operator may open bar 196 in order to grasp the leading end of the sandwich and may proceed to advance the sandwich between rollers 106 and 108, the brake having been deactuated with the opening of bar 196. As shown, this means comprises a pair of links 280 on opposite sides of housing 20, each link having one end connected, as at 282, to one of cranks 274 and the other end connected to an extension 284 of bar 196. With reference to Figs. 10 and 11, this construction is such that counterclockwise rotation of bar 196 through an arc of 90 degrees causes clockwise rotation of each crank 274, disengagement of stop pins 256 from apertures 255 in sheet 70, and consequent deactuation of brake 246. After rotating bar 196 in a counterclockwise direction in order to deactuate brake 246, bar 196 then preferably is rotated in a clockwise direction until edge 202 rests against the sandwich extending from exit 168 so that during advancement and processing of the sandwich a minimum of light enters processing chamber 123. Counterclockwise movement of each crank 274 is limited by a pair of lugs 286 which are connected to legs 158 of cradle 154. Such clockwise movement normally causes counterclockwise movement of crank 274 to a position at which cam portion 276 is positioned outside of the region into which finger 278 is to advance when sto pins 256 again engage apertures 255 in sheet 70. In order that the locking means operate to arrest advancement of the sandwich through processing chamber 123, notwithstanding that bar 196 is fully open, the aperture in which each crank receives stub shaft 258 is made larger in diameter than that portion of the stub shaft which it receives. Such resilient means as leaf spring 285 (Fig. 12) is suitably attached to stub shaft 258 to urge crank 274 into vertical position. This construction permits pivotal movement of crank 274 in a plane which includes the longitudinal axis of stub shaft 258. Thus, if bar 196 is fully open so that crank 274 is in its extreme clockwise position with cam portion 276 projecting into the region into which finger 278 is to advance when stop pins 256 again engage apertures 255 in sheet 70, advancement of finger 278 into this region is nevertheless possible. When such advancement occurs, finger 278 abuts against cam portion 276 to cause pivotal movement of crank 274 in a plane which includes the longitudinal axis of stub shaft 258. Release of stop pins 256 from apertures 255 with which they have engaged now may be accomplished by first closing and then pivoting bar 196 to its fully open position.

In the operation of the illustrated camera, rear portion 116 and intermediate portion 118 are pivoted to open position to provide access to the interior of housing 20. Spool 47 is mounted on member 50 and roll 72 is inserted into compartment 80. Sheet 46 is drawn from spool 47 onto guide surfaces 30, which position frames of sheet 46 in the focal surface of the lens of assembly 22. Sheets 46 and 70 now are superposed and are extended from roller 106 and along the rear surface of intermediate portion 118 to a point beyond the pivoted end thereof. Rear portion 116 now is pivoted to closed position in order to operatively juxtapose rollers 106 and 108 and to form processing chamber 123. The leading ends of sheets 46 and 70 now are grasped and are drawn from processing chamber 123 until stop pins 256 engage the apertures 255 in sheet 70 which are associated with the leading frame of sheet 46. The leading frame of sheet 46 is now in position for exposure. After exposure of this frame, bar 196 is pivoted to fully open position to disengage stop pins 256 from apertures 255 with which they have engaged. An operator once again may grasp the leading ends of sheets 46 and 70 and may advance the sheets between rollers 106 and 108 until stop pins 256 once again engage the apertures 255 in sheet 70. During advancement of sheets 46 and 70 between rollers 106 and 108 and into processing chamber 123, processing composition 76 is ejected from the trailing edge of a container 74 and is spread between a frame of sheet 46 and an image-receiving area of sheet 70, the processing composition acting to process the frame and to form in the image-receiving area a positive print. When the superposed frame and image-receiving area have remained in processing chamber 123 for a predetermined processing period, door 170 is opened and the section of sheet 70 which carries the positive print is ripped from the remainder of sheet 70 and at the same time is peeled from the frame of sheet 46. As the exposure and processing cycle continues, portions of sheets 46 and 70 that extend through exit 168 may be evenly severed from the remainder of sheets 46 and 70 by means of edge 202 of bar 196.

It is to be expressly understood that the herein disclosed invention may be applied to photographic structures other than the camera herein illustrated. The invention, for example, may be applied to various processing units which are not directly associated with a photographic exposure means.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic apparatus for processing an exposed photosensitive sheet; said apparatus comprising a housing, pressure-applying means for superposing said photosensitive sheet on another sheet and spreading a layer of processing composition between said sheets in order to form a sandwich, at least one of said sheets having along an edge thereof a row of regularly spaced apertures, means associated with said housing and defining a processing chamber into which said sandwich may be advanced from said pressure-applying means, means providing an opening to said processing chamber, closure means for said opening, means for mounting said closure means for movement relative to said housing between an open position and a closed position, said closure means, when in open position, providing access to said processing chamber through said opening and, when in closed position, rendering said processing chamber substantially lighttight, and stop means comprising a pin, said pin being constrained to engage said one of said apertures in order to arrest advancement of said sandwich when said stop means is operative and being constrained from engaging said one of said apertures in order to permit advancement of said sheets when said stop means is inoperative; the improvement comprising link means operatively connected between said closure means and said stop means, said link means rendering said stop means inoperative temporarily in response to movement of said closure means from closed position to open position, and automatic means for rendering said stop means operative after said stop means has been rendered inoperative temporarily.

2. In a photographic apparatus for processing an exposed photosensitive sheet; said apparatus comprising a housing, pressure-applying means for superposing said photosensitive sheet on another sheet and spreading a layer of processing composition between said sheets in order to form a sandwich, one of said sheets having a pair of rows of regularly spaced apertures along opposite edges thereof, means associated with said housing and defining a processing chamber into which said sandwich may be advanced from said pressure-applying means, means providing an opening to said processing chamber, closure means for said opening, and means for mounting said closure means for movement relative to said housing between an open position and a closed position, said closure means, when in open position, providing access to said processing chamber through said opening and, when in closed position, rendering said processing chamber substantially lighttight; and the improvement comprising stop means comprising a pair of pins, said pair of pins being mounted on a bridge pivoted to said housing, said bridge being pivotable toward said sandwich so that said pair of pins engages apertures on opposite edges of said one sheet in order to arrest advancement of said sheets, said bridge being pivotable away from said sandwich so that said pair of pins disengages said apertures on opposite edges of said one sheet in order to permit advancement of said sandwich, and link means operatively connected between said closure means and said bridge, said link means causing said bridge to pivot away from said sandwich in response to movement of said closure means from closed position to open position.

3. In a photographic apparatus of the type wherein a photosensitive sheet is exposed and thereafter processed in conjunction with another sheet by superposing said photosensitive sheet on said other sheet and spreading a processing composition between said sheets; said apparatus comprising a housing, a pair of pressure-applying members between which said photosensitive sheet and said other sheet may be advanced in superposed relation with a thin layer of processing composition therebetween, said pressure-applying members being mounted in said housing, and stop means for halting advancement of said sheets between said pressure-applying members; the improvements in said stop means comprising an anvil mounted in said housing and having a surface in superposition with which portions of at least one of said sheets may move during advancement thereof between said pressure-applying members, said one sheet having at least an aperture, a support means mounted in said housing for movement perpendicular to and parallel to a portion of said one sheet in superposition with said anvil, at least a stop pin mounted on said support means in alignment with said anvil and said aperture, said stop pin being adapted to engage said aperture, resilient means operatively connected to said support means for urging said stop pin toward said anvil and in a direction opposite to the direction of advancement of said one sheet past said surface, brake means operative to arrest advancement of said sheets, said brake means being associated with said support means in such a manner as to be urged against the action of said resilient means into contact with at least one of said sheets upon advancement of said sheets with said stop pin in engagement with said aperture and means for disengaging said stop pin from said aperture in order to render said brake means inoperative.

4. In a photographic apparatus of the type wherein a photosensitive sheet is exposed and thereafter processed in conjunction with another sheet by superposing said photosensitive sheet on said other sheet and spreading a processing composition between said sheets; said apparatus comprising a housing having a front portion and a rear portion, said front portion being provided with a lens and shutter means, guide means on said front portion adapted to position said photosensitive sheet in the focal surface of said lens, means on said front portion on one side of said guide means for holding a roll of photosensitive sheet, means on said front portion on the opposite side of said guide means for holding a roll of said other sheet, said rear portion being pivotally connected to said front portion on said opposite side, a mounting means pivotally connected to said front portion on said one side, a pair of pressure-applying members, one of said members being mounted on said mounting means, the other of said members being mounted on said rear portion, said rear portion and said mounting means, when in open position, providing access to the interior of said housing, said mounting means, when in closed position, defining in conjunction with said front portion an exposure chamber, said pressure-applying members, when said rear portion and said mounting means are in closed position, being capable of receiving therebetween said photosensitive sheet and said other sheet in superposed relation and being capable of forming therefrom a sandwich by spreading a thin layer of processing composition between said sheets, said rear portion and said mounting means, when in closed position, defining a processing chamber adapted to receive said sandwich from said pressure-applying members, said processing chamber having a mouth at said one side of said front portion through which said sandwich may be removed from said processing chamber, closure means pivoted to said rear portion for movement between an open position and a closed position, said closure means, when in closed position, rendering said mouth lighttight and, when in open position, permitting advancement of said sandwich out of said processing chamber, and stop means operatively mounted on said rear portion for arresting advancement of said sandwich between said pressure-applying members when a predetermined length of said sandwich has advanced through said processing chamber; the improvement comprising link means operatively connected between said closure means and said stop means, said link means rendering said stop means inoperative temporarily in response to movement of said closure means from closed position to open position, and automatic means for rendering said stop means operative after said stop means has been rendered inoperative temporarily.

5. A photographic apparatus comprising a housing defining a chamber having an entrance passage and an exit passage, said chamber being so constructed as to enable a sheet having at least one aperture to advance through said entrance passage into said chamber and thence through said exit passage from said chamber, closure means for said exit passage, means for mounting said closure means for movement relative to said housing between an open position and a closed position, said closure means, when in open position, permitting advancement of said sheet from said chamber through said exit passage and, when in closed position, preventing advancement of said sheet from said chamber through said exit passage and rendering said chamber lighttight, stop means for halting advancement of said sheet, said stop means comprising an anvil mounted in said housing and having a surface in superposition with which portions of said sheet may move during advancement thereof, said sheet having at least an aperture therein, a support means mounted in said housing for movement perpendicular to and parallel to a portion of said sheet in superposition with said anvil, at least a stop pin mounted on said support means in alignment with said anvil and said aperture, resilient means operatively connected to said support means for urging said stop pin toward said anvil and in a direction opposite to the direction of advancement of said sheet, brake means movable toward said sheet to arrest advancement of said sheet and movable away from said sheet to permit advancement of said sheet, resilient means for urging said stop means away from said sheet, said brake means being associated with said support means in such a manner as to be urged against the action of said last-mentioned resilient means into substantial abutment with said sheet upon advancement of said sheet with said stop pin in engagement with said aperture, release means operatively connected to said support means for urging said stop pin away from said anvil in order to disengage said stop pin from said aperture and to render said brake means inoperative, and link means connected between said release means and said closure means, said link means rendering said release means operative in order to disengage said stop pin from said aperture in response to movement of said closure means from closed position to open position.

6. A photographic apparatus comprising a housing defining a path through which a sheet having at least an aperture is adapted to advance and stop means for arresting advancement of said sheet, said stop means comprising an anvil mounted in said housing and having a surface in superposition with which portions of said sheet may move during advancement thereof, a shaft on said housing, a lever having an elongated slot therethrough, said lever receiving said shaft in said slot and being slidable and pivotable on said shaft, at least one pin operatively connected to said lever, said pin being aligned with said anvil and with said aperture, resilient means operatively connected to said lever so as to urge said pin in a direction perpendicular to and toward a portion of said sheet in superposition with said anvil and in a direction parallel with and opposite to the direction of advancement of said portion, said resilient means normally urging one end of said slot into contact with said shaft, the other end of said slot being urged towards said shaft upon engagement of said pin with said aperture and advancement of said sheet, brake means operative to arrest advancement of said sheet, said brake means being associated with said lever in such a manner as to be urged against the action of said resilient means into substantial abutment with said sheet upon advancement of said sheet with said pin in engagement with said aperture, and means for disengaging said stop pin from said aperture in order to render said brake means inoperative.

7. A photographic apparatus comprising a housing defining a path through which a sheet having at least an aperture is adapted to advance and stop means for arresting advancement of said sheet, said stop means comprising an anvil mounted in said housing and having a surface in superposition with which portions of said sheet may move during advancement thereof, a shaft on said housing, a lever having an elongated slot therethrough, said lever receiving said shaft in said slot and being slidable and pivotable on said shaft, at least one pin operatively connected to said lever, said pin being aligned with said anvil and with said aperture, resilient means operatively connected to said lever so as to urge said pin in a direction perpendicular to and toward a portion of said sheet in superposition with said anvil and in a direction parallel with and opposite to the direction of advancement of said portion, said resilient means normally urging one end of said slot into contact with said shaft, the other end of said slot being urged towards said shaft upon engagement of said pin with said aperture and advancement of said sheet, brake means operative to arrest advancement of said sheet, said brake means being associated with said lever in such a manner as to be urged against the action of said resilient means into substantial abutment with said sheet upon advancement of said sheet with said pin in engagement with said aperture, and means for disengaging said stop pin from said aperture in order to render said brake means inoperative, said lever being provided with an extension, said last-mentioned means including an arm pivotally mounted on said shaft, said arm having a finger portion which is adapted to abut against said extension when said arm is pivoted in order to release said pin from said aperture.

8. The apparatus of claim 7 wherein said arm is pivotable substantially in a plane that includes the longitudinal axis of said shaft, the construction of said arm being such that engagement of said pin with said aperture and advancement of said sheet cause said brake means to be urged into substantial abutment with said sheet irrespective of the position of said arm.

9. In a photographic apparatus of the type wherein a photosensitive sheet is exposed and thereafter processed in conjunction with another sheet by superposing said photosensitive sheet on said other sheet and spreading a processing composition between said sheets; said apparatus comprising a housing, a pair of pressure-applying members between which said photosensitive sheet and said other sheet may be advanced in superposed relation with a layer of processing composition therebetween, said pressure-applying members being mounted in said housing, and stop means for arresting advancement of said sheets between said pressure-applying members; improvements in said stop means comprising an anvil mounted in said housing and having a surface in superposition with which portions of at least one of said sheets may move during advancement thereof between said pressure-applying members, said one sheet having along at least one of its edges a succession of apertures, a shaft on said housing, a lever having an elongated slot therethrough, said lever receiving said shaft in said slot and being slidable and pivotable on said shaft, at least one pin operatively connected to said lever, said pin being aligned with said anvil and with said apertures, resilient means operatively connected to said lever so as to urge said pin in a direction perpendicular to and toward a portion of said one sheet in superposition with said anvil and in a direction parallel with and opposite to the direction of advancement of said portion, said resilient means normally urging one end of said slot into contact with said shaft, the other end of said slot being urged toward said shaft upon engagement of said pin with one of said apertures and advancement of said one sheet between said pressure-applying members, brake means operative to arrest advancement of said sheets, said brake means being associated with said lever in such a manner as to be urged against the action of said resilient means into abutment with at least one of said sheets upon advancement of said sheets with said pin in engagement with said one aperture, and means for disengaging said stop pin from said aperture in order to render said brake means inoperative.

10. In a photographic apparatus of the type wherein a photosensitive sheet is exposed and thereafter processed in conjunction with another sheet by superposing said photosensitive sheet on said other sheet and spreading a processing composition between said sheets; said apparatus comprising a housing, a pair of pressure-applying members between which said photosensitive sheet and said other sheet may be advanced in superposed relation with a layer of processing composition therebetween, said pressure-applying members being mounted in said housing, and stop means for arresting advancement of said sheets between said pressure-applying members; the improvements in said stop means comprising an anvil mounted in said housing and having a surface in superposition with which portions of at least one of said sheets may move during advancement thereof between said pressure-applying members, said one sheet having along at least one of its edges a succession of apertures, a shaft on said housing, a lever having an elongated slot therethrough, said lever receiving said shaft in said slot and being slidable and pivotable on said shaft, at least one pin operatively connected to said lever, said pin being aligned with said anvil and with said apertures, resilient means operatively connected to said lever so as to urge said pin in a direction perpendicular to and toward a portion of said one sheet in superposition with said anvil and in a direction parallel with and opposite to the direction of advancement of said portion, said resilient means normally urging one end of said slot into contact with said shaft, the other end of said slot being urged toward said shaft upon engagement of said pin with one of said apertures and advancement of said one sheet between said pressure-applying members, brake means operative to arrest advancement of said sheets, said brake means being associated with said lever in such a manner as to be urged into abutment with at least one of said sheets upon advancement of said sheets with said pin in engagement with said one aperture, and means for disengaging said stop pin from said aperture in order to render said brake means inoperative, said lever being provided with an extension, said last-mentioned means including an arm pivotally mounted on said shaft, said arm having a finger portion which is adapted to abut against said extension when said arm is pivoted in order to release said pin from said one aperture.

11. The apparatus of claim 10 wherein said arm is pivotable substantially in a plane that includes the longitudinal axis of said shaft, the construction of said arm being such that engagement of said pin with said one aperture and advancement of said sheets cause said brake means to be actuated irrespective of the position of said arm.

12. A photographic apparatus comprising a housing defining a chamber having an entrance passage and an exit passage, said chamber being so constructed as to enable a sheet having at least one aperture to advance through said entrance passage into said chamber and thence through said exit passage from said chamber, closure means for said exit passage, means for mounting said closure means for movement relative to said housing between an open position and a closed position, said closure means, when in open position, permitting advancement of said sheet from said chamber through said exit passage and, when in closed position, rendering said chamber lighttight, and stop means operative to arrest said advancement of said sheet, said stop means comprising an anvil mounted in said housing and having a surface in superposition with which portions of said sheet may move during said advancement thereof, a shaft on said housing, a lever having an elongated slot therethrough, said lever receiving said shaft in said slot and being movable and pivotable on said shaft, at least one pin operatively connected to said lever, said pin being aligned with said anvil and with said aperture, resilient means operatively connected to said lever so as to urge said pin in a direction perpendicular to and toward a portion of said sheet in superposition with said anvil and in a direction parallel with and opposite to the direction of said advancement, said resilient means normally urging one end of said slot into contact with said second shaft, the other end of said slot being urged toward said shaft upon engagement of said pin with one of said apertures and said advancement of said sheet, brake means operative to arrest advancement of said sheet, said brake means being associated with said lever in such a manner as to be urged into abutment with said sheet upon advancement thereof with said pin in engagement with said aperture, and link means operatively connected between said closure means and said means, said link means rendering said stop means inoperative temporarily in response to movement of said closure means from closed position to open position.

13. The apparatus of claim 12 having a bell crank pivotally mounted at its apex on said shaft, said lever being provided with an extension, said bell crank having a pair of arms one of which abuts against said extension when said bell crank is pivoted in a predetermined direction in order to release said pin from said aperture, said link means being operatively connected to the other of said pair of arms in order to pivot said bell crank in said predetermined direction when said closure means is moved from closed position to open position.

14. The apparatus of claim 13 wherein said bell crank is pivotable substantially in a plane that includes the longitudinal axis of said shaft so that engagement of said pin with said aperture and advancement of said sheets cause said brake means to be actuated irrespective of the position of said bell crank.

15. A photographic apparatus comprising a housing defining a chamber disposed along a surface and having an entrance passage and an exit passage, said chamber being so constructed as to enable a sheet having at least a pair of apertures at its opposed edges to advance through said entrance passage into said chamber and thence through said exit passage from said chamber, elongated closure means for said exit passage, means for mounting said closure means for movement relative to said housing between an open position and a closed position, said closure means, when in open position, permitting advancement of said sheet from said chamber through said exit passage and, when in closed position, rendering said chamber lighttight, stop means for arresting said advancement of said sheet, said stop means comprising an anvil mounted in said housing and having a surface in superposition with which portions of said sheet may move during said advancement thereof, a pair of shafts mounted on said housing at opposite edges of said chamber, a pair of levers having a pair of elongated slots therethrough, one each of said levers having one each of said elongated slots therethrough, one each of said levers receiving one each of said shafts in one each of said slots and being movable and pivotable on one each of said shafts, a bridge affixed at its opposite ends to said levers, a pair of pins affixed to said bridge at opposite edges of said chamber, said pins being aligned with said anvil and with said apertures, a pair of springs, one each of said springs being operatively connected between one each of said levers and said housing so as to bias said bridge in a direction perpendicular to and toward a portion of said sheet in superposition with said anvil and in a direction parallel with and opposite to the direction of said advancement of said sheet, said springs normally urging one end of one each of said slots into contact with one each of said shafts, the other end of one each of said slots being urged toward one each of said shafts upon engagement of one each of said pins with one each of said apertures and said advancement of said sheet, brake means operative to arrest advancement of said sheet, said brake means being urged into abutment with said sheet by said bridge upon advancement of said sheet with one each of said pins in engagement with one each of said apertures, and a pair of links, one each of said links being operatively connected between one each of the ends of said closure means and one each of said levers, said links rendering said stop means inoperative temporarily in response to movement of said closure means from closed position to open position.

16. The apparatus of claim 15 having a pair of bell cranks, one each of said bell cranks being pivotally mounted at its apex on one each of said shafts, said levers being provided with extensions, one each of said levers being provided with one each of said extensions, one each of said links being operatively connected between an arm of one each of said bell cranks and one each of said ends of said closure means, said bell cranks having finger portions, one each of said bell cranks having one each of said finger portions, one each of said finger portions being adapted to abut against one each of said extensions when said bell cranks are pivoted in order to release said pins from said apertures.

17. The apparatus of claim 16 wherein one each of said bell cranks is pivotable substantially in a plane that includes the longitudinal axis of one each of said shafts so that the engagement of one each of said pins with one each of said apertures and advancement of said sheet cause said brake means to be actuated irrespective of the position of said bell cranks.

18. The apparatus of claim 17 wherein said brake means is disposed between said pins.

19. In a photographic apparatus of the type wherein a photosensitive sheet is exposed and thereafter processed; said photographic apparatus comprising a housing, said housing defining an exposure chamber within which a photosensitive sheet may be exposed, pressure-applying means which are adapted to superpose said photosensitive sheet and another sheet and to spread between said sheets a layer of processing composition to form a sandwich, said housing defining a processing chamber into which said sandwich may be advanced from said pressure-applying means, means providing an opening through said processing chamber, closure means for said opening, means for mounting said closure means for movement relative to said housing between an open position and a closed position, said closure means, when in open position, providing access to said processing chamber through said opening and, when in closed position, rendering said processing chamber lighttight, and stop means, said stop means, when actuated, being operative to arrest advancement of said sandwich; the improvement comprising link means one end of which is mechanically connected to said closure means and the other end of which is mechanically connected to said stop means, said link means being responsive to movement of said closure means for deactuating said stop means.

20. In a photographic apparatus comprising a housing defining a chamber having an entrance passage and an exit passage, said chamber being so constructed as to enable a sheet having at least one stop-engaging means to advance through said entrance passage into said chamber and thence through said exit passage from said chamber, closure means for said exit passage, means for mounting said closure means for movement relative to said housing between an open position and a closed position, said closure means, when in open position, permitting advancement of said sheet from said chamber through said exit passage and, when in closed position, rendering said exit passage lighttight; the improvement including stop means, said stop means being constrained to engage said stop-engaging means in order to arrest advancement of said sheet when said stop means is operative and being constrained from engaging said stop-engaging means in order to permit advancement of said sheet when said stop means is inoperative, link means mechanically connected between said closure means and said stop means, said link means rendering said stop means inoperative temporarily in response to movement of said closure means from closed position to open position, and automatic means for rendering said stop means operative after said stop means has been rendered inoperative temporarily.

21. In a photographic apparatus of the type wherein a photosensitive sheet is exposed and thereafter processed; said photographic apparatus comprising a housing, said housing defining an exposure chamber within which a photosensitive sheet may be exposed, pressure-applying means which are adapted to superpose said photosensitive sheet and another sheet and to spread between said sheets a layer of processing composition to form a sandwich, said housing defining a processing chamber into which said sandwich may be advanced from said pressure-applying means, means providing an opening through said processing chamber, closure means for said opening, means for mounting said closure means for movement relative to said housing between an open position and a closed position, said closure means, when in open position, providing access to said processing chamber through said opening and, when in closed position, substantially closing said opening, and stop means, said stop means, when actuated, being operative to arrest advancement of said sandwich; the improvement comprising link means one end of which is mechanically connected to said closure means and the other end of which is mechanically connected to said stop means, said link means being responsive to movement of said closure means for deactuating said stop means.

References Cited in the file of this patent

UNITED STATES PATENTS

| | | |
|---|---|---|
| 1,274,223 | Weiss | July 30, 1918 |
| 1,501,677 | McMahon | July 15, 1924 |
| 1,514,789 | Quinn | Nov. 11, 1924 |
| 2,455,111 | Carbone | Nov. 30, 1948 |
| 2,543,159 | Fairbanks | Feb. 27, 1951 |